(12) United States Patent
Davis et al.

(10) Patent No.: US 10,289,985 B2
(45) Date of Patent: May 14, 2019

(54) METHODS OF CONSTRUCTING A PAPER CHECK

(71) Applicant: EFT Network, Inc., Hawthorne, NY (US)

(72) Inventors: Steven Davis, Hawthorne, NY (US); Seth Oestreicher, Hawthorne, NY (US); Robert Northrop, Hawthorne, NY (US); Martin Klamen, Hawthorne, NY (US)

(73) Assignee: EFT NETWORK, INC., Hawthorne, NY (US)

( * ) Notice: Subject to any disclaimer, the term of this patent is extended or adjusted under 35 U.S.C. 154(b) by 527 days.

(21) Appl. No.: 14/854,720

(22) Filed: Sep. 15, 2015

(65) Prior Publication Data
US 2017/0076257 A1    Mar. 16, 2017

(51) Int. Cl.
*G06Q 40/00* (2012.01)
*G06Q 20/04* (2012.01)
*G06Q 20/32* (2012.01)

(52) U.S. Cl.
CPC ....... *G06Q 20/042* (2013.01); *G06Q 20/3221* (2013.01); *G06Q 20/3224* (2013.01); *G06Q 40/128* (2013.12)

(58) Field of Classification Search
CPC ........ G06Q 20/10; G06Q 20/36; G06Q 20/04; G06Q 20/102; G06Q 20/3674; G06Q 20/042
See application file for complete search history.

(56) References Cited

U.S. PATENT DOCUMENTS

| | | | |
|---|---|---|---|
| 7,113,925 B2 | 9/2006 | Waserstein et al. | |
| 9,087,354 B1 * | 7/2015 | Hambir | G06Q 30/0601 |
| 2002/0052852 A1 * | 5/2002 | Bozeman | G06Q 20/04 705/64 |
| 2006/0161501 A1 * | 7/2006 | Waserstein | G06Q 20/042 705/65 |
| 2008/0077454 A1 * | 3/2008 | Shepherd | G06Q 10/02 705/5 |
| 2008/0086420 A1 * | 4/2008 | Gilder | G06Q 20/04 705/44 |
| 2014/0297517 A1 * | 10/2014 | Gnanasekaran | G06Q 20/0425 705/39 |
| 2016/0012465 A1 * | 1/2016 | Sharp | G06Q 20/18 705/14.17 |
| 2017/0207923 A1 * | 7/2017 | Damstra | H04L 12/1478 |

* cited by examiner

*Primary Examiner* — Mike Anderson
(74) *Attorney, Agent, or Firm* — W&C IP

(57) ABSTRACT

For a consumer having a bank checking account but who is without a preprinted paper check, a paper check is electronically constructed for the consumer on a transaction basis.

14 Claims, 12 Drawing Sheets

Steve:

Click here to make your payment: https://www.txtacheck.com:152/Authenticate.aspx?id=97cc652e-1600-4be0-b31b-849bb5c6937d

FIG. 3

Please enter the following information to access your payment.

Account Number:

Submit

Please enter the following information to access your payment.

Account Number:

741852

Submit

Please enter the following information to access your payment.

Account Number:

741852

"https://www.txtacheck.com:152" Would Like To Use Your Current Location

OK

Don't Allow

FIG. 3C

```
STEVE PAYER                                    Check # 1001
123 Your Street                                Date: 9/9/2015
Anytown, NY 10532
9148828241

Pay To  My Payment Company                     $ 45.00
Forty Five Dollars and No Cents
JPMORGAN CHASE BANK Memo My Payment
    ⑈0 2 10000 2 1⑈  7 4 1 8 5 2 ⑈  1 0 0 1
```

Please verify the following information.

Submit

Clear/Resign

Please sign your name using your finger in the Blue Box then click Next to continue.

I hereby designate Txt-A-Check.com as my agent to:

(i) issue my check to the payee, (ii) place the signature I provided on my check, (iii) print my check using magnetic ink so that the check will have a Magnetic Ink Character Recognition ("MICR") line, and (iv) deliver my check to the payee.

I hereby acknowledge and agree that I cannot stop payment on the check and that the balance in my account will be sufficient to pay the check when presented.

☑ Check here to agree to the above statement

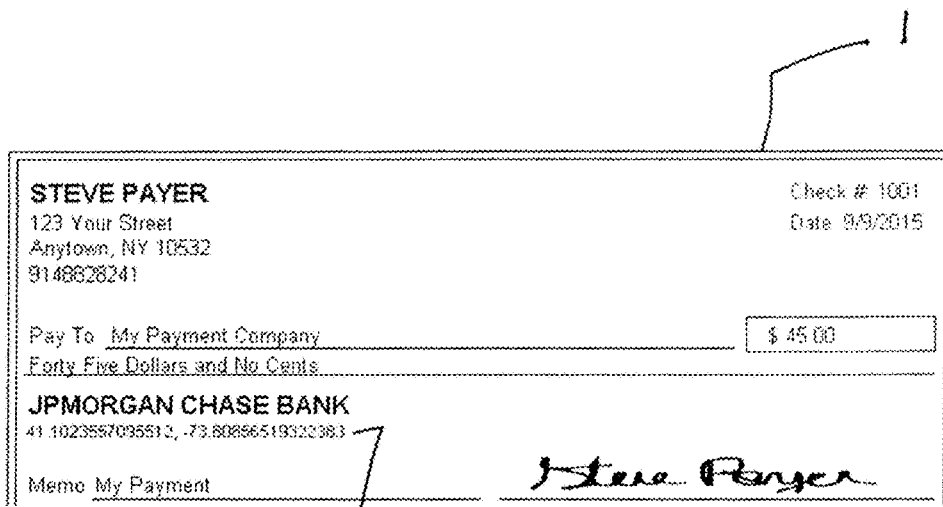

FIG. 3F

Your check payment has been submitted for processing.

Date / Time: 9/9/2015 5:47:06 PM

Pay To: My Payment Company

Amount: 45.00

ID: 97cc652e-1600-4be0-b31b-849bb5c6937d

Account #: XX1852

Email: steve @email.com

FIG. 3G

Details

Back to List (/Payments)

Payor Information

Name: Steve Payer
Address: 123 Your Street
Anytown, NY 10532
Phone #: 9148828241
E-mail: steve@email.com
Location: 41.1023557095512 -73.80856619322363
245 Saw Mill River Road, Hawthorne, NY 10532, USA

Check Information

| | |
|---|---|
| Link Expiration Date/Time: | 9/10/2015 11:59:59 PM |
| Pay To: | My Payment Company |
| Amount: | $45.00 |
| Routing #: | 021000021 |
| Account #: | 741652 |
| Check #: | 1001 |
| Memo: | My Payment |

Detail Information

| | |
|---|---|
| Code: | SDZY |
| Payment Id: | 97cc652a-1600-4be0-b31b-8498b6c6937d |
| Check Type: | Personal |
| Payment Method: | Digital Signature |
| Initiated By: | steveuser |
| Create Date: | 9/3/2015 5:43:10 PM |
| Status: | Confirmation Displayed |

FIG. 3H

METHODS OF CONSTRUCTING A PAPER CHECK

FIELD OF THE INVENTION

The invention generally relates to payment technology, especially to payment technology useable by consumers with a checking account.

BACKGROUND OF THE INVENTION

Many consumers in the United States continue to acquire goods, services, utilities, housing, etc., for which they sometimes owe creditors balances especially overdue balances. A creditor may be owed money by a consumer debtor who has a checking account with money therein, but that will not necessarily translate into the debtor on his own initiative using that money to write a paper check to the creditor, put the check into a suitably addressed envelope, stamp the envelope, and mail the envelope. In some cases, the debtor may be residing, or on travel, somewhere other than where the postal mail being sent by the creditor is going, or the debtor may otherwise be out of touch with his postal mail. In other cases, the debtor's mail may be unopened, or not effectively processed. A certain population of consumers may have been hospitalized or sick, or struggling as they age with daily living tasks such as retrieving mail, opening mail, buying stamps, writing checks, etc. Some debtors may be prone to use money in their checking account to pay the particular creditor only if that creditor somehow gets their attention before they spend in a different direction, for whatever reason.

In the case of mobile phone accounts, mobile phone companies have developed electronic technology for texting customers if payment is overdue and prompting the customer to phone in and pay by credit card. But this only addresses a small fraction of situations, and there continues to be an unmet need for technology useable more generally by creditors to address overdue accounts.

SUMMARY OF THE INVENTION

The present invention is useful to provide payment technology useful in contexts of debtors with overdue accounts, as well as other contexts in which consumers who have a checking account want to make payments.

In one preferred embodiment, the invention provides a method of constructing a check, comprising: generating, performed by a computer, a transaction number for a new transaction in which a payor is expected to pay a payee by check; receiving, performed by a computer, a set of data that has been entered by a human into data input fields and associating, performed by, a computer, the set of data with the transaction number; processing and formatting, performed by a computer, the data set into at least one webpage specific to the transaction number, wherein the webpage comprises an image of a front of a check payable to the Payee for the Amount and in which the Routing Number displays at a bottom of the check; transmitting, performed by a computer, an electronic communication to a payor-associated electronic device having an IP address or a payor-associated computer having an IP address, wherein the electronic communication comprises a link to a website, wherein when the link is clicked-on, the at least one webpage specific to the transaction number is displayed on the payor-associated electronic device or the payor-associated computer; receiving, performed by a computer, a digital signature from the payor-associated electronic device or the payor-associated computer; and, after receiving the digital signature, constructing an image of a payor-signed check signed by the Payor payable to the Payee for the Amount and in which the Routing Number displays at the bottom of the check.

In another preferred embodiment, the invention provides a method of constructing a consumer check, comprising: prompting a user to take a certain photograph; prompting the user to email the photograph to a system comprising at least one computer; upon receiving the photograph by the system, if the photograph was sent via smart phone, capturing, performed by the system, a GPS location of the smart phone; and, processing the received photograph, along with other received data, into a signed consumer check, wherein the processing is performed by the system.

The invention in another preferred embodiment provides a method of constructing a check, comprising: receiving, by a system comprising at least one computer, a data set from a payee or payor contemplating a check to be constructed in which the payor pays the payee; constructing a webpage specific to the to-be-constructed check; prompting the payor to view a certain webpage specific to the to-be-constructed check; and, upon the certain webpage being accessed, capturing an IP address from which the webpage was accessed.

Turning to another preferred embodiment, the invention provides a method of securing a check transaction, comprising: onto a check that is NOT blank as to signature, amount or payee, printing (such as, e.g., printing in in MICR toner ink) a GPS location thereon.

The invention in another preferred embodiment provides a method of securing a check transaction, comprising: onto a check that is NOT blank as to signature, amount or payee, printing a data set in MICR toner ink thereon, such as, e.g., inventive methods wherein the data set printed in MICR toner ink comprises a GPS location.

DETAILED DESCRIPTION OF A PREFERRED EMBODIMENT

Figure 1:
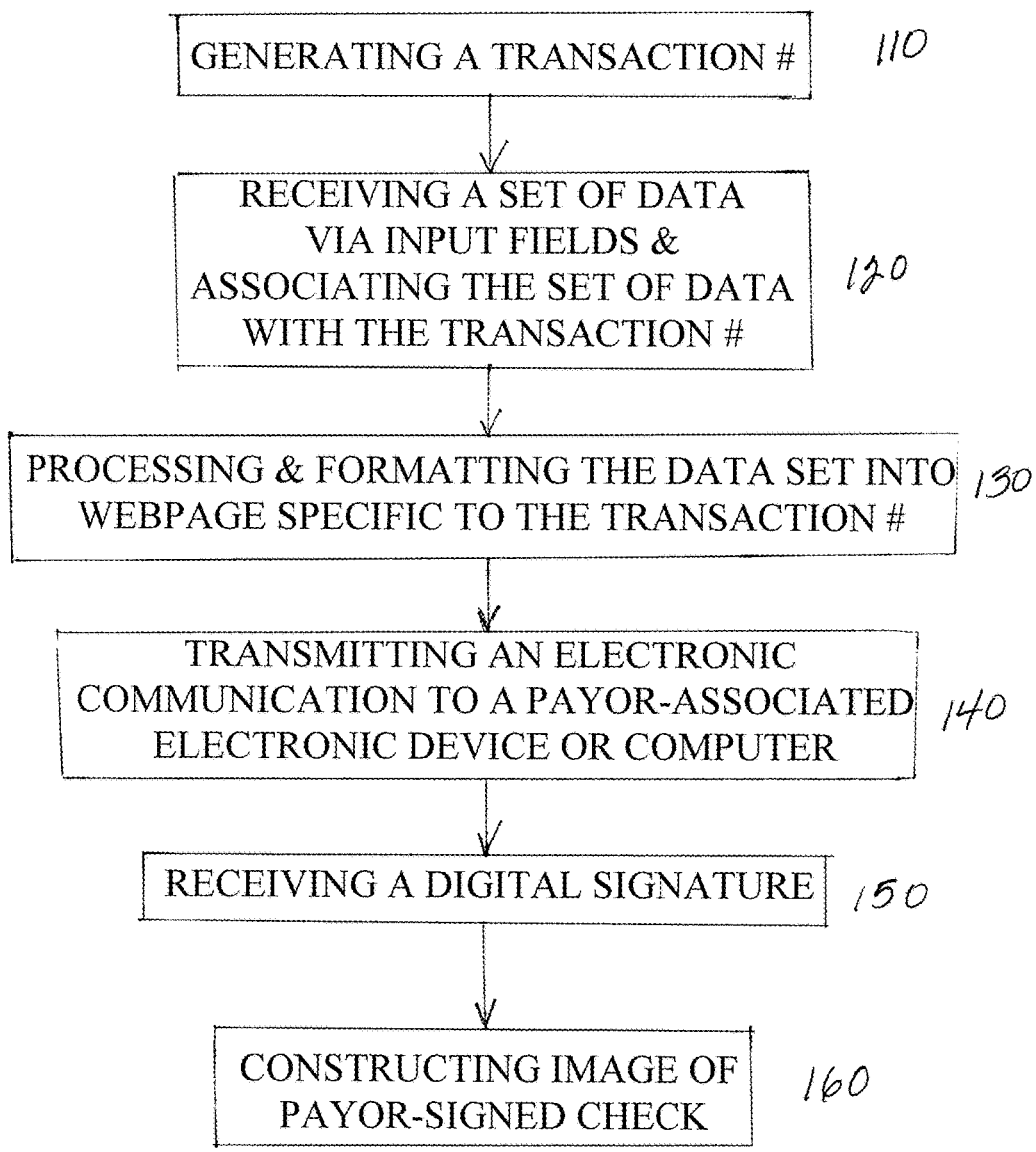
FIG. 1 is a flow chart of inventive method steps in a first embodiment of the invention.

Referring to FIG. 1, inventive steps for constructing a check (preferably a consumer check) are performed by a computer, as follows. A computer performs a step 110 of generating a Transaction Number, which corresponds to a new transaction in which a payor is expected to pay a payee by check.

After the generating step 110, a computer performs a step 120 of receiving a set of data via input fields (such as, e.g., data entered by a human into data input fields) and associating the set of data with the Transaction Number. For preferred examples of data input fields for receiving data from the consumer, and data sets for use in practicing the invention, see, e.g., Examples 1-1E herein.

After the data set has been received and associated with the Transaction Number, a computer performs a step 130 of processing and formatting the data set into a webpage specific to the Transaction Number, preferably a webpage that comprises an image of a front of a check payable to the Payee for the Amount and in which the Routing Number displays at a bottom of the check.

After the webpage has been constructed in the processing and formatting step 130, there is performed a step 140 of transmitting an electronic communication to a payor-associated electronic device having an IP address or a payor-associated computer having an IP address. Preferably the electronic communication comprises a link to a website, wherein when the link is clicked-on, the at least one webpage specific to the transaction number is displayed on the payor-associated electronic device or the payor-associated computer.

For practicing a step of transmitting (performed by a computer) an electronic communication to a payor-associated electronic device having an IP address or a payor-associated computer having an IP address, most preferably the transmitting step comprises transmitting an electronic communication to a payor-associated smart phone. In other inventive embodiments, the transmitting step comprises transmitting an electronic communication to a payor-associated personal computer, or to another payor-associated device.

Optionally, access to the webpage specific to the Transaction Number is further secured by PIN-protection. In such an embodiment, a PIN is computer-generated and provided to the payor separately, NOT in the same electronic communication by which the link to the website is provided to the payor.

After the transmitting step 140, there is performed a step 150 of receiving a digital signature from the payor-associated electronic device or the payor-associated computer.

A preferred example of a digital signature in the inventive methods is a fingertip signature.

After the receiving step 150, there is performed a step 160 of constructing an image of a payor-signed check signed by the Payor payable to the Payee for the Amount and in which the Routing Number displays at the bottom of the check.

For at least two different computers to be used for performing steps 110, 120, 130, 140, 150, 160 of the check-constructing method is preferred, especially use of a first computer located at a processing company and a second, different computer located at a business that is a customer of the processing company. Advantageously, if the first computer is located at a processing company, and the second computer is located at a creditor (who is a customer of the processing company), the processing company's computer can carry out certain communications with the debtor's smart phone, and the creditor's computer can carry out certain other communications with the debtor's smart phone without certain documents and information (such as the debtor's banking information) "touching" the processing company's computer.

In practicing inventive methods, preferably at least one webpage specific to a Transaction Number is constructed. In some embodiments, exactly one webpage specific to the transaction number is generated. In other embodiments, more than one webpage, specific to the transaction number, is generated.

When a webpage specific to a Transaction Number is constructed, preferably a link (such as, e.g., a one-time use link) to that webpage is provided to the payor associated with the Transaction Number, such as by a computer-performed step of transmitting (a one-time-use link via SMS text to a device of the payor; a computer-performed step of emailing a one-time-use link to a device or computer of the payor; etc. A preferred example of a computer performing such steps is, e.g., a computer belonging to the payee.

After a webpage specific to a Transaction Number has been constructed, preferably the check-constructing method comprises a step of capturing, performed by a computer, the IP address in usage when the webpage specific to the Transaction Number is being accessed. For examples when the webpage is being accessed by a smart phone, see Examples 3-3C herein. Preferably the check-constructing method comprises storing, as permanent records, an identity of an IP address from which the webpage is accessed and a date and time of the webpage access from that IP address.

After a webpage specific to a Transaction Number has been constructed preferably a computer performs tracking what activity is experienced by the webpage specific to the transaction number. Examples of tracking steps are, e.g., tracking when the at least one webpage specific to the transaction is viewed; tracking when an action of saving the webpage has occurred; tracking when a confirmation action on the website has occurred; tracking when a confirmation of the constructed check has been displayed; etc.

When tracking is performed, preferably storing steps for results of the tracking are performed, such as, e.g., storing, performed by a computer, a record comprising a) activity type and b) date and time of activity, wherein the stored record is associated with the transaction number.

Inventive methods preferably comprise a printing-onto-paper step, such as, e.g., a step of printing (most preferably using MICR toner ink) the image of the payor-signed check onto paper.

When a GPS location has been captured (e.g., via a capturing step of capturing a GPS location of a smart phone), preferably subsequently printing the captured GPS location onto the check is performed, most preferably wherein the printing step comprises printing, in MICR toner ink, the captured GPS location onto the check. A preferred example of a form used for the GPS location printed onto the check is numerical GPS coordinates.

When a captured GPS location has been printed in MICR toner ink onto a paper check, preferably a subsequent scanning step is performed of scanning the check.

To use MICR toner ink in the printing-onto-paper step is most preferable.

To construct a commercially useful embodiment, method steps should be repeatable over a large number of Transaction Numbers 1 . . . N, in which the payors differ, the payees differ, and the routing numbers differ.

Figure 2:
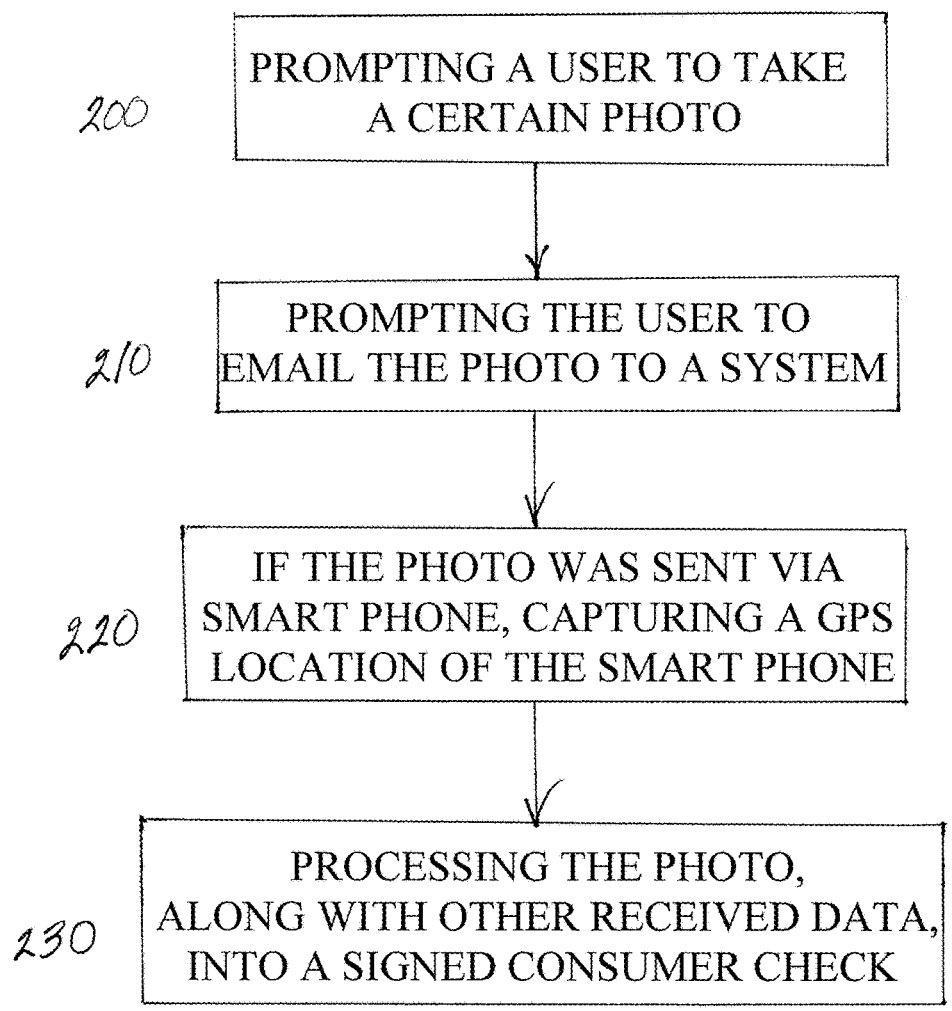
FIG. 2 is a flow chart of inventive method steps in a second embodiment of the invention.

Referring to FIG. 2, inventive steps for constructing a check (preferably a consumer check) are performed by a computer, as follows.

A computer performs a step 200 of prompting a user to take a certain photograph, followed by a step 210 of prompting the user to email the photograph to a system comprising at least one computer.

Upon the system's receiving the photograph, if the photograph was sent via smart phone, the system performs a step 220 of capturing a GPS location of the smart phone, followed by a step 230 of processing the received photograph, along with other received data, into a signed consumer check.

It will be appreciated that the method steps of FIGS. 1 and 2 optionally may be used in combination.

Figure 3A:
FIGS. 3-3G are screen shots sequentially displayed to a payor-customer and exemplifying an inventive check-construction method being practiced in an embodiment.
FIG. 3H is a screen shot is a Details screen shot viewable by the payor-customer after a check-construction method underlying FIGS. 3-3G has been performed.
Figure 3B:

When a constructed check comprises a GPS location printed thereon (such as, e.g., a GPS location 2 on check 1 in FIG. 3F), advantageously the GPS location can be processed to obtain a street map showing the GPS location, such as, e.g., processing the GPS location via google.com/maps/place tool to obtain a street map with the GPS location marked.

Preferably an inventive system obtains both (1) GPS location coordinates when the payor-user is requesting check-construction and (2) a street address proffered by a payor-user as being his own address. For obtaining, in the first instance, the GPS location coordinates that will be printed and subsequently used, standard system-to-device communication is preferred. For obtaining, in the first instance, the proffered address of the payor-user, system to user communication is preferred, such as having him type his address into input boxes.

Figure 4:
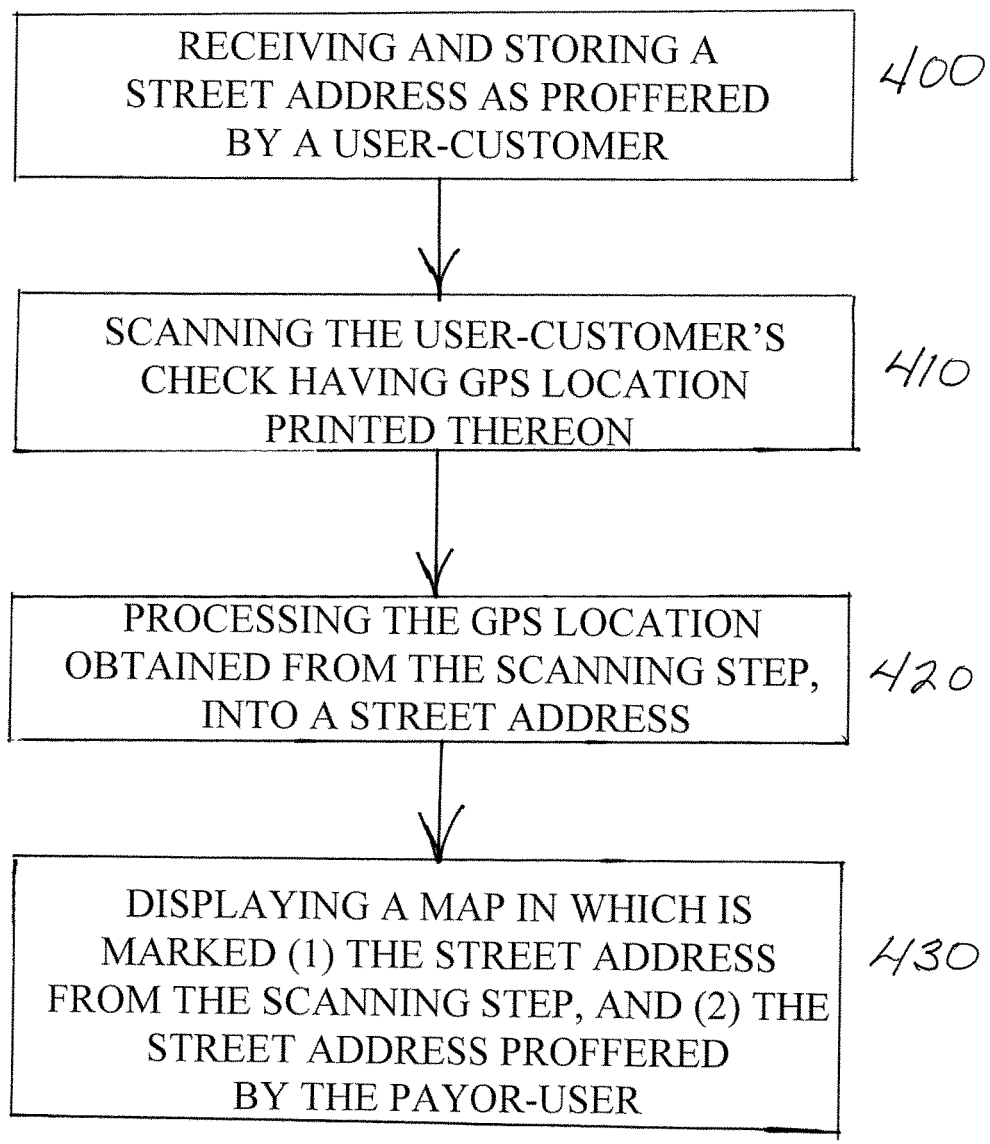
FIG. 4 depicts a flow chart of inventive method steps in an embodiment of the invention.

When both a GPS location and a proffered payor-user street address are available, advantageously mapping and comparison can be accomplished, such as by practicing inventive steps 400, 410, 420, 430 (FIG. 4). For example, preferably an inventive system performs a step 400 of receiving and storing a street address as proffered by a user-customer (such as, e.g., a street address typed-in by a customer into an input box on a webpage), and also a step 410 of scanning the user-customer's check having GPS location printed thereon. Most commonly, step 400 is performed at an earliest time, such as when a user-customer is first accessing the inventive system, and step 410 is performed later, after check construction, which can be at a range of times, from soon after check-construction or at a relatively later time. After the scanning step 410, a step 420 is performed of processing the GPS location obtained from the scanning step, into a street address, followed by displaying 430 a map in which is marked (1) the street address from the scanning step, and (2) the street address proffered by the payor-user. The address provided by the consumer therefore can be compared to the GPS-derived address.

Preferably the map in the displaying step 430 further comprises a marked distance between the two addresses, such as, e.g., a marked distance shown as a line with mileage overlaid thereon. Preferably the inventive system further performs a step of displaying a "map" button and a zooming tool, useable to zoom in on the mapped GPS coordinates.

Steps 110, 120, 130, 140, 150, 160, 200, 210, 220, 230, 400, 410, 420, 430 illustrated in the attached Figures should be appreciated to be performed by one or more computers or automated system(s).

The invention may be further appreciated with reference to the following examples without the invention being limited thereto.

Example 1

In this example, data input fields that are received from the consumer correspond to a data set comprising a Name of the Payor; a Name of the Payee; an Amount to be paid by check by the Payor to the Payee; a number proffered by the payor as being a Routing Number of a bank account of the Payor; and Telephone Number of the Payor and/or an email of the Payor.

Example 1A

In this example, the data input fields that are received from the consumer correspond to: Customer Name; Customer Mobile Phone Number; Bank Name of Customer's Bank and Routing Number; Customer's Checking Account Number, Payee Name; and Amount to be paid to Payee.

Example 1B

In this example, the data set of Example 1 or 1A further comprises a mailing address of the Payor.

Example 1C

In this example, the data set (such as a data set according to Example 1-1B or 1D) associated with the transaction number comprises one or more of: a number to be used as a check number on the check under construction; a memo content to be used as a memo line on the check under construction.

Example 1D

In this example, the data set (such as a data set according to Example 1-1C) associated with the transaction number comprises an expiration date setting when the link to be sent to the payor is to expire.

Example 1E

In this example, the link provided to the payor is a one-time-use link.

Example 2

After receipt of input that is a number proffered by the payor as being a Routing Number, computer-performed processing (see, e.g., Examples 2A-2B) is performed on that proffered number.

Example 2A

The computer-performed processing on the proffered number is hash total processing for whether the proffered number is impossible as an actual routing number.

Example 2B

The computer-performed processing on the proffered number is comparing the proffered number against a Federal Reserve list of actual routing numbers.

Example 2C

In this example, the check-constructing method includes storing a table of routing numbers in which a respective routing number has associated therewith a bank name; for the proffered routing number, retrieving the associated bank name; and displaying onscreen the associated bank name for the proffered routing number.

Example 3 (Smart Phone)

When a webpage specific to a Transaction Number is accessed via a smart phone, a computer performs a step of capturing a GPS location of the smart phone.

Example 3A

After the step of capturing the GPS location of the smart phone, the computer performs a step of printing the captured GPS location onto the check.

Example 3B

The printing step of Example 3A comprises printing, in MICR toner ink, the captured GPS location onto the check.

Example 3C

After the step of printing, in MICR toner ink, the captured GPS location onto the check, a step is performed of scanning the check.

Example 3D

An inventive system displays a screen along the lines of FIG. 3 to a payor-user "Steve Payor", "Click here to make your payment . . . ", after which a screen along the lines of FIG. 3A is displayed to him, and he enters his account number (see FIG. 3B) and submits, after which a screen along the lines of FIG. 3C, about location usage, is displayed to him.

Subsequently, the system displays to user Steve Payor a check screen along the lines of FIG. 3D, and after he has clicked "submit" on the check screen, the system displays to him a signature screen along the lines of FIG. 3E for receiving his signature using his fingertip.

The system then displays a screen along the lines of FIG. 3F to user Steve Payor, in advance of steps being performed, all by the system, of: issuing Steve Payor's check to the payee, placing the signature that Steve Payor provided on his check, printing his check using magnetic ink so that the check will have a MICR line, and delivering his check to the payee. Check 1 (FIG. 3F) comprises a displayed GPS location 2, which is the GPS location that was received as current location (of Steve Payor's smart phone) as reflected in FIG. 3C.

After Steve Payor has performed the "check here" task (FIG. 3F), the system displays to him a screen along the lines of FIG. 3G, that his check payment has been submitted for processing with summary information.

Example 3E

Figure 3D:
Figure 3E:
Figure 3E:

In this example, a system is constructed to optionally present a screen along the lines of FIG. 3D, or alternately a modified version of the screen of FIG. 3D (namely, a screen by which the payor-user edits the data used in constructing the check) to a payor-user.

While the invention has been described in terms of its preferred embodiments, those skilled in the art will recognize that the invention can be practiced with modification within the spirit and scope of the appended claims.

What we claim as our invention is:

1. A method of constructing a paper check, comprising:
   generating, performed by a computer, a transaction number for a new transaction in which a payor is expected to pay a payee by paper check;
   receiving, performed by a computer, a set of data that has been entered by a human into data input fields and associating, performed by, a computer, the set of data with the transaction number, wherein the data set comprises:
   a Name of the Payor;
   a Name of the Payee;
   an Amount to be paid by paper check by the Payor to the Payee;
   a number proffered by the payor as being a Routing Number of a bank account of the Payor;
   at least one selected from the group consisting of a Telephone Number of the Payor and an email of the Payor;
   processing and formatting, performed by a computer, the data set into at least one webpage specific to the transaction number, wherein the webpage comprises an image of a front of a check payable to the Payee for the Amount and in which the Routing Number displays at a bottom of the check;
   transmitting, performed by a computer, an electronic communication to a payor-associated electronic device having an IP address or a payor-associated computer having an IP address, wherein the electronic communication comprises a link to a website, wherein when the link is clicked-on, the at least one webpage specific to the transaction number is displayed on the payor-associated electronic device or the payor-associated computer;
   when the webpage is accessed via a smart phone, capturing a GPS location of the smart phone;
   after capturing the GPS location of the smart phone, printing, in MICR toner ink, the captured GPS location onto the paper check;
   after the step of printing, in MICR toner ink, the captured GPS location onto the paper check, scanning the paper check;
   receiving, performed by a computer, a digital signature from the payor-associated electronic device or the payor-associated computer;
   after receiving the digital signature, constructing an image of a payor-signed check signed by the Payor payable to the Payee for the Amount and in which the Routing Number displays at the bottom of the check.

2. The paper check-constructing method of claim 1, further comprising printing, in MICR toner ink, the image of the payor-signed check onto paper.

3. The paper check-constructing method of claim 1, wherein the data set further comprises an expiration date setting when the link to be sent to the payor is to expire.

4. The paper check-constructing method of claim 1, wherein the transmitting step comprises transmitting an electronic communication to a payor-associated smart phone.

5. The paper check-constructing method of claim 1, further comprising capturing, performed by a computer, the IP address in usage when the webpage specific to the transaction number is being accessed.

6. The paper check-constructing method of claim 1, further comprising storing, as permanent records, an identity of an IP address from which the webpage specific to the transaction number is accessed and a date and time of the webpage access from that IP address.

7. The method of claim 1, wherein the link is a one-time-use link.

8. The method of claim 1, wherein the constructed check consists of paper and MICR ink, a MICR ink-printed payor signature and a MICR ink-printed GPS location being included.

9. A method of constructing a consumer check, comprising:
   prompting a user to take a certain photograph;
   prompting the user to email the photograph to a system comprising at least one computer, wherein the photograph is sent via smart phone;
   upon receiving the photograph by the system, for the photograph sent via smart phone, capturing, performed by the system, a GPS location of the smart phone; and processing the received photograph, along with other received data, into a signed consumer check, wherein the processing is performed by the system;

after capturing the GPS location of the smart phone, printing, in MICR toner ink, the captured GPS location onto the paper check;

after the step of printing, in MICR toner ink, the captured GPS location onto the paper check, scanning the paper check.

10. The method of claim 9, further comprising printing onto paper, in MICR toner ink, the signed check.

11. The method of claim 9, wherein the consumer check consists of paper and MICR ink, a MICR ink-printed payor signature and a MICR ink-printed GPS location being included.

12. A method of constructing a paper check, comprising:
receiving, by a system comprising at least one computer, a data set from a payee or payor contemplating a paper check to be constructed in which the payor pays the payee;

constructing a webpage specific to the to-be-constructed paper check;

prompting the payor to view the webpage specific to the to-be-constructed paper check; and upon the webpage specific to the to-be-constructed paper check being accessed, capturing an IP address from which the webpage specific to the to-be-constructed paper check was accessed;

when the webpage is accessed via a smart phone, capturing a GPS location of the smart phone;

after capturing the GPS location of the smart phone, printing, in MICR toner ink, the captured GPS location onto the paper check;

after the step of printing, in MICR toner ink, the captured GPS location onto the paper check, scanning the paper check.

13. The paper check-constructing method of claim 12, further comprising printing onto paper, in MICR toner ink, a signed paper check.

14. The method of claim 12, wherein the paper check consists of paper and MICR ink, a MICR ink-printed payor signature and a MICR ink-printed GPS location being included.

\* \* \* \* \*